(No Model.)
C. K. WELCH.
ELASTIC TIRE.
No. 575,797. Patented Jan. 26, 1897.
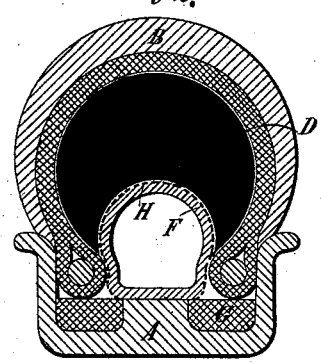
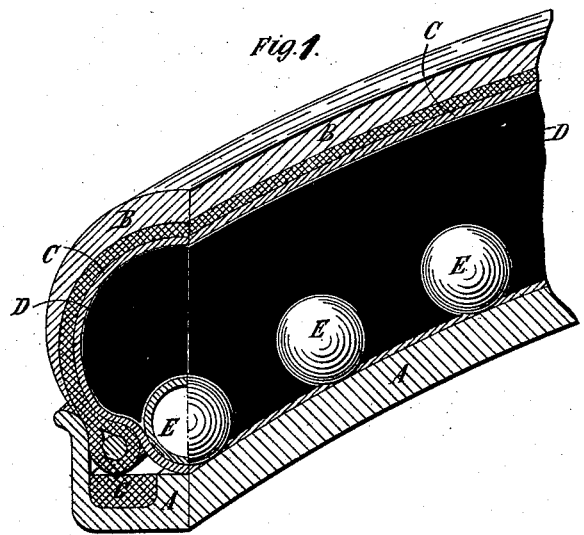
Witnesses:
Raphaël Netter
Ernest Hopkinson
Charles K. Welch, Inventor
by Duncan Page, Attorneys.

UNITED STATES PATENT OFFICE.

CHARLES KINGSTON WELCH, OF COVENTRY, ENGLAND, ASSIGNOR TO THE PNEUMATIC TYRE COMPANY, LIMITED, OF DUBLIN, IRELAND.

ELASTIC TIRE.

SPECIFICATION forming part of Letters Patent No. 575,797, dated January 26, 1897.

Application filed October 8, 1895. Serial No. 564,978. (No model.) Patented in England June 2, 1894, No. 10,719; in France September 2, 1895, No. 250,021; in Belgium September 9, 1895, No. 117,345; in Italy September 12, 1895, XXX, 39,757, and in Denmark September 8, 1896, No. 732.

*To all whom it may concern:*

Be it known that I, CHARLES KINGSTON WELCH, engineer, a subject of the Queen of Great Britain, residing at Coventry, England, have invented certain new and useful Improvements in Elastic Tires, of which the following is a specification, reference being had to the accompanying drawings.

I have obtained patents for the improvement herein described in the following countries: Great Britain, No. 10,719, dated June 2, 1894; France, No. 250,021, dated September 2, 1895; Belgium, No. 117,345, dated September 9, 1895; Denmark, No. 732, dated September 8, 1896, and Italy, Vol. XXX, No. 39,757, dated September 12, 1895.

My invention relates to elastic tires, and comprises the improvements hereinafter described.

The object of my said invention is to provide elastic tires which shall be more resilient than solid india-rubber tires without having the disadvantage which pneumatic tires have in general of being liable to collapse when punctured.

According to my invention I construct tires of jelly or the like substance, inclosed in a suitable jacket or cover having cores or inextensible edges or their equivalents for retaining the cover on the rim. I inclose in the jelly one or more air-tubes or a series of other suitable chambers, spherical or otherwise, filled with air for increasing the elasticity of the tire. I prefer to inflate and so put the jelly under pressure, and when I use balls or other chambers I prefer to put the jelly under pressure, and so compress the air in the balls or chambers.

In the accompanying drawings, I have illustrated by way of example several forms of my invention.

Figure 1 is a part transverse section and part circumferential section of a tire having air balls or chambers embedded in the jelly. Fig. 2 is a transverse section of a similar tire having an air-tube inclosed within the jelly.

A is the rim.

B is the inextensible cover, which is secured to the rim by endless wires or other suitable cores contained in its sides or edges. In lieu of such cores I may employ various other methods of securing the cover—for example, those methods wherein the edges of the cover are received in recesses formed by the turned-in edges of the rim. It is obvious in this instance that the jelly, being under pressure, assists in holding the tire to the rim. In other cases the jelly under pressure performs the same functions as the air under pressure in pneumatic tubes.

C is an inner tube for inclosing the jelly or like substance D.

In Fig. 1 there are shown a number of small elastic air balls or chambers E within the tube C and inclosed by the jelly D. The said balls are introduced into the tube C before the ends of the said tube are united. The balls may be temporarily fastened in position to insure that they shall retain their proper relative positions while the jelly is being introduced and before the latter sets. The jelly is introduced through a valve or cock, as above described. The balls or chambers are employed for the purpose of increasing the elasticity of the tire, and also so as to fill up any spaces that might otherwise be formed by the contraction of the jelly on cooling.

In Fig. 2 a small continuous or endless air tube or chamber F is shown inclosed by the jelly which is on the outside of the said small tube between the latter and the fabric cover. This air-tube is provided with a valve and is inflated in the usual manner. With this construction of tire I may introduce or apply the jelly to the inner side of the cover next the fabric before the cover is applied to the rim. For example, I may make a ring of jelly of crescent section, as shown in Fig. 2, and place or fix the said ring inside the cover, thus forming a thick arched cover, which is then applied to the rim around the small air-tube in the well-known manner. When the air-tube is inflated, it communicates its pressure to the jelly and fills out the cover, thus rendering the tire firm, but very elastic. It will be seen that the air-tube of such a tire is not readily accessible to puncture in ordinary use. In some cases I employ two or more air-tubes, and also in some cases I use tubes which are not endless, but are butt-ended.

It is obvious that with this construction of tire when the air-tube is deflated and the filling-strips G in the grooves in the rim are removed the cover and jelly can be removed together from the rim in the manner now well known.

In some instances I use a dividing-strip, of fabric, rubber, or other material H, between the air-tube and the jelly. This strip is so arranged that it does not prevent the expansion of the air-tube when the latter is inflated to put the tire under pressure. For example, the fabric may be attached at one side to the outer cover and be loose or unattached at the other side.

I sometimes provide for allowing the air in the tube to escape through a suitable valve while the jelly is being pumped or otherwise injected into the tube, and at times I expel as much of the air as possible from the tube by flattening or rolling the tube before injecting the jelly, or I may otherwise exhaust the air from the tube. The slight amount of air then left in the tube will not interfere with the introduction of the jelly. If it is desired to inject more jelly after the first portion is set, I may heat the valve to assist the operation. I sometimes introduce either with the jelly in filling or afterward such quantity of air or gas as may be found desirable for the purpose of maintaining the pressure.

The restraining-envelop or inextensible cover may be made of inextensible fabric, woven or otherwise constructed after any of the methods now known and either with or without an interior lining of india-rubber. The cover may be impregnated with rubber.

The jelly which I use is made of gelatin, glue, or other suitable gelatinous substance mixed with a suitable quantity of water, treacle, or other solvent. Other substances may be mixed with the jelly, but must not be of such a nature as to destroy its resiliency. I may secure the tire to the rim in various ways, for example, by endless wire cores, as shown in the drawings, or by other well-known methods of securing pneumatic tires to the rims of wheels.

By the term "air" in the above specification I desire to include gas. When I desire to remove the jelly from the interior of the tire, I warm the same, so as to liquefy it, and then extract it through any suitable orifice, such as the valve-orifice.

My improved tire is more especially suited for the wheels of vehicles which carry heavy loads.

What I claim is—

1. In an elastic tire, the combination with an outer cover, of an inner tube containing jelly or the like gelatinous substance, and an elastic chamber or chambers containing air under pressure and operative to put the jelly under compression, substantially as described.

2. In an elastic tire, the combination with an outer cover of a chamber or chambers containing air under pressure, jelly or like gelatinous substance between the said chamber or chambers and the said cover, and a dividing-strip between the jelly and the said tube or tubes, substantially as described.

In testimony whereof I have hereunto set my hand this 11th day of September, 1895.

CHARLES KINGSTON WELCH.

Witnesses:
FRED SHARPE,
V. W. ROBINSON.